US011207693B2

(12) United States Patent
Cors et al.

(10) Patent No.: US 11,207,693 B2
(45) Date of Patent: Dec. 28, 2021

(54) GRIPPER

(71) Applicant: TECAN TRADING AG, Mannedorf (CH)

(72) Inventors: Nicolas Cors, Rapperswil (CH); Martin Kuster, Eschenbach (CH)

(73) Assignee: TECAN TRADING AG, Mannedorf (CH)

(*) Notice: Subject to any disclaimer, the term of this patent is extended or adjusted under 35 U.S.C. 154(b) by 70 days.

(21) Appl. No.: 16/765,112

(22) PCT Filed: Oct. 25, 2018

(86) PCT No.: PCT/EP2018/079224
§ 371 (c)(1),
(2) Date: May 18, 2020

(87) PCT Pub. No.: WO2019/120700
PCT Pub. Date: Jun. 27, 2019

(65) Prior Publication Data
US 2020/0348323 A1    Nov. 5, 2020

(30) Foreign Application Priority Data

Dec. 18, 2017   (EP) .................................. 17208026

(51) Int. Cl.
*B01L 9/00*       (2006.01)
*G01N 1/14*       (2006.01)
(Continued)

(52) U.S. Cl.
CPC .................. *B01L 9/54* (2013.01); *G01N 1/14* (2013.01); *G01N 35/0099* (2013.01);
(Continued)

(58) Field of Classification Search
CPC ........... B01L 9/54; B01L 3/0213; G01N 1/14; G01N 2001/1418; G01N 2035/1051
See application file for complete search history.

(56) References Cited

U.S. PATENT DOCUMENTS 5,961,086 A * 10/1999 Moore ...................... B01L 9/06
                                                            248/314
6,734,026 B1 * 5/2004 Kenney ................... B01L 3/021
                                                             422/504
(Continued)

FOREIGN PATENT DOCUMENTS

WO       2009033128 A2    3/2009
WO   WO-2011054430 A1 *   5/2011  ........... B65H 3/0883

OTHER PUBLICATIONS

International Search Report for corresponding PCT application No. PCT/EP2018/079224, dated Feb. 4, 2019.
(Continued)

*Primary Examiner* — Benjamin R Schmitt
(74) *Attorney, Agent, or Firm* — Notaro, Michalos & Zaccaria P.C.

(57) ABSTRACT

A gripper having a mechanical coupling that can be connected to a pipetting tube, at least one fluid channel extends from the coupling and a negative pressure can be transmitted, the gripper having at least one suction cup that is connected to the coupling through the at least one fluid channel as a result of which the negative pressure can be transmitted from the coupling to the at least one suction cup, and the at least one suction cup in the intended use position of the gripper is aligned such that a rim of a suction cup of the at least one suction cup is aligned in a substantially vertical plane.

19 Claims, 4 Drawing Sheets

(51) Int. Cl.
*G01N 35/00* (2006.01)
*G01N 35/04* (2006.01)
*B01L 3/02* (2006.01)

(52) U.S. Cl.
CPC ............ *G01N 35/04* (2013.01); *B01L 3/0213* (2013.01); *G01N 2001/1418* (2013.01)

(56) References Cited

U.S. PATENT DOCUMENTS 6,739,448 B1 5/2004 Bevirt et al.
2011/0115243 A1* 5/2011 Desai .................... B66C 1/0231
294/65

OTHER PUBLICATIONS

International Preliminary Report on Patentability and Written Opinion, dated Jun. 23, 2020.

* cited by examiner

GRIPPER

TECHNICAL FIELD OF THE INVENTION

The present invention relates to a gripper for microplates, lids and other laboratory articles, in particular a suction gripper of a pipetting unit.

DESCRIPTION OF THE RELATED ART

Grippers are known from the prior art with which laboratory articles can be laterally clamped with gripping fingers or paddles. Such a gripper can be arranged on a pipetting tube of a handling arm of a pipetting unit.

In order to be able to grip the laboratory items firmly and securely, large lateral clamping forces are required, which lead to increased wear on the mechanics of the handling arm.

Alternatively, grippers are known in which the laboratory articles are not clamped on the side but are held from below. For this, however, the gripper fingers or paddles require access to the underside of the laboratory items. In order to enable this access, the laboratory articles must be adapted, for example by forming recesses on the underside of the side walls of the laboratory articles and/or the transfer positions have to be adapted.

SUMMARY OF THE INVENTION

An object of the present invention is to provide a gripper for a pipetting unit in which the disadvantages listed above are avoided.

This object is achieved by a gripper with the features of claim 1. Further embodiments of the gripper and a pipetting system are defined by the features of further claims.

A gripper according to the invention comprises a mechanical coupling with which the gripper can be connected to a pipetting tube, at least one fluid channel which extends from said coupling and with which a negative pressure can be transmitted. The gripper comprises at least one suction cup, which is connected to the coupling through the at least one fluid channel, as a result of which the negative pressure can be transmitted from the coupling to the at least one suction cup. The at least one suction cup is aligned such that a rim of a suction bell of the at least one suction cup, in the intended use position of the gripper, is aligned in a substantially vertical plane. This design has the advantage that laboratory items can be held on the side with the at least one suction cup. The suction cup can, for example, be attached to a flat or slightly curved side wall of a laboratory article. A special design of the laboratory articles, for example with a gripper holder, is therefore unnecessary. The alignment of the rims of the suction cups in an essentially vertical plane does not exclude certain deviations from the vertical.

Deviations of up to plus or minus 45° from the vertical can be achieved. A side grip of a laboratory article is still possible.

In one embodiment, the fluid channel comprises at least a first section, which extends in a substantially vertical plane in the intended use position of the gripper. The fluid channel comprises a component, such as a tube or another elongated hollow body, in which a through opening is provided. The through opening can extend in a straight line, angled or curved within the component. A rectilinear through opening can be, for example, a through bore and an angled one can comprise a plurality of bores or through bores which at least partially overlap, wherein certain openings of the bores can be closed in order to produce an angled channel orientation. Alternatively, the first section may extend substantially horizontally from the coupling.

In one embodiment, the at least one first section extends essentially in the direction of a vertical axis and/or the at least one first section extends inclined with respect to the vertical axis. The first section extends essentially in the same direction as the pipetting tube on which it is arranged with the coupling. This allows a simple construction. An inclined embodiment can be advantageous, for example, in the case of a plurality of suction cups arranged next to one another, since there is no direct connection between the individual suction cups with a rectilinear fluid channel which could collide with objects in the area of a laboratory article receptacle.

In one embodiment, the fluid channel comprises at least a second section, which extends in a substantially horizontal plane in the intended use position of the gripper. This construction allows a horizontally offset arrangement of the suction cups with respect to the coupling and thus with respect to the pipetting tube. Several suction cups can also be arranged along a horizontal section.

In one embodiment, the second section includes an inner section that extends substantially in a first horizontal direction and an outer section that extends substantially in a second horizontal direction. This enables a horizontally offset arrangement of the suction cups in two horizontal directions with respect to the coupling. In the intended use position, the pipetting tube extends essentially in a vertical direction. With a suitable combination of vertical and horizontal sections, the suction cups can be arranged and aligned as desired with respect to the pipetting tube.

In one embodiment, the outer section is oriented substantially perpendicular to the inner section. This enables a parallel offset of the suction cup with respect to the coupling.

In one embodiment, the sections of the fluid channel are straight or curved. Straight sections can be realized with bores and curved sections, for example with curved pipes. A combination of straight and curved sections is also possible. Of course, the gripper can at least partially consist of injection moulded parts, for example made of plastic or metal. Alternatively, the gripper can be generated at least partially by a 3D printer, by laser sintering or by other additive manufacturing processes.

In one embodiment, the gripper comprises two or more suction cups. With several suction cups, the total resulting holding force can be increased with the same negative pressure acting on the suction cups. With two or more suction cups, higher tilting forces can also be absorbed, which can arise if the suction cups cannot attack precisely in the centre of gravity of the laboratory article.

In one embodiment, at least two of the suction cups are arranged in a common horizontal plane. Alternatively, the suction cups can be arranged in horizontal planes parallel to one another. The offset arrangement allows a more compact arrangement of several suction cups in a narrower space.

In one embodiment, the rims of the suction cups are aligned parallel or at an angle to one another. This makes it easier to grip laboratory items with curved surfaces, for example. The suction cups can face each other if, for example, a petri dish is to be gripped with the gripper. The suction cups are then directed against a common central axis or are oriented at an angle to the common central axis. The suction cups can be aligned parallel or at an angle of up to 90° to each other.

In one embodiment, the suction cups are arranged at regular intervals from one another. Alternatively, the suction cups can be arranged and aligned irregularly to one another.

In one embodiment, each suction cup can be fastened to the fluid channel with a screw-in holder. This makes it easier to mount or replace the suction cups.

In one embodiment, the lateral outer dimensions of an upper free end of the body of the coupling are larger than the lateral dimensions of the first section of the fluid channel. This design provides a robust and stable coupling area and a slim area of the fluid channel.

In one embodiment, a first recess is provided in the upper end face of the coupling, which extends along the vertical axis and in which the pipetting tube can be received and fixed. The inner contour of the recess essentially corresponds to the outer contour of the pipetting tube to be received, with sufficient clearance being provided in the contact area so that the gripper can be arranged on the pipetting tube with reasonable effort.

In one embodiment, the recess comprises a cylindrical first section, a tapering second section and a cylindrical third section, the diameter of the third section being smaller than the diameter of the first section. Alternatively, the recess can comprise a cylindrical and/or a conically converging section. It is also possible for the recess to comprise a plurality of cylindrical sections which are stepped relative to one another.

In one embodiment, a first force disk is arranged such that it can be clamped between the body and an axial guiding ring at the upper free end of the coupling, the inner contour of the first force disk projecting into the interior of the contour of the first recess in the clamped state. The first force disk is made of an elastic material, for example of an elastic plastic, such as rubber or silicone. The gripper can be centred, clamped and aligned on the pipetting tube with the force disk. In addition, the gap between the gripper and the pipetting tube can be sealed.

In one embodiment, at least one second recess is provided at the upper free end of the coupling, which extends radially outward from the first recess and in which a second elevation of the pipetting tube can be received, as a result of which a rotated of the gripper relative to the pipetting tube can be prevented. Alternatively, the inner contour of the recess can be designed such that it can form a positive fit with the outer contour of the pipetting tube. A plurality of such second recesses can also be provided, which are arranged uniformly or are distributed unevenly on the circumference of the first recess.

In one embodiment, a circumferential first groove is provided at the lower end of the third section of the first recess, in which a ring-shaped first seal is arranged, the inner contour of which protrudes into the interior of the contour of the third section. The seal arranged on the end opposite the pipetting tube not only seals, but at the same time forms a stop for the pipetting tube, which is not hard, as a result of which damage to the pipetting tube can be prevented.

In one embodiment, a circumferential second groove is provided in the third section of the first recess, in which an annular second seal is arranged, the inner contour of which projects into the interior of the contour of the third section. For example, an O-ring or a lip seal is provided. The second seal also centres and seals.

In one embodiment, a circumferential third groove is provided in the first section of the first recess, in which an annular third seal, or in which an annular third seal and a second force disk are arranged, wherein the inner contour of the third seal protrudes into the interior of the contour of first section. The third seal can also be an O-ring or a lip seal. The second force disk can be made of plastic or metal. A radially inward force can be exerted on the third seal with the force disk. This design reduces the stiffness behaviour of the third seal when a force is applied to the inside of the third seal, since the force disk is more flexible compared to the gripper material in the area of the coupling.

In one embodiment, a circumferential fourth groove is provided in the first section of the first recess, in which an annular, elastic coupling element is arranged, the inner contour of which projects into the interior of the contour of the first section. For example, the coupling element is a toroidal spring. The coupling element can comprise a seal, for example in the form of an at least partial plastic casing. The coupling element can also be completely surrounded by plastic.

In one embodiment, at least one radial bore is provided in the coupling, which extends radially outward from the fourth groove and in which a pusher is arranged, with which a radially inward force can be exerted on the coupling element. With several pushers, an evenly distributed external force on the coupling element can be generated on the circumference. The overall strength also increases. This enables a precise adjustment of the force which is required for the arrangement of the gripper on the pipetting tube.

The mentioned embodiments of the gripper can be combined with one another as long as they do not contradict each other.

A pipetting system according to the invention comprises a pipetting device with a vacuum source and with at least one pipetting tube which is connected to the vacuum source, the pipetting system further comprising at least one gripper according to one of the preceding embodiments, which can be fixed to the pipetting tube with the coupling. For example, a gripper can be arranged on a pipetting tube. However, several pipetting tubes can also be connected to a common gripper.

A pipetting system can comprise a number of pipetting tubes, each of the pipetting tubes being movable laterally in a first horizontal X direction and in a second horizontal Y direction and in a vertical Z direction. Alternatively, several pipetting tubes can be arranged on a common slide. For example, the tubes can be moved together in the X direction and the tubes can be moved separately in the Y direction with respect to the slide. For example, the distances between the pipetting tubes when moving in the Y direction can always be the same, i.e. be equidistant. A first gripper can be arranged on a first pipetting tube so that its first horizontal axis is aligned with the X direction of the system and a second gripper can be arranged on a second pipetting tube such that its first horizontal axis is aligned in the direction opposite to the X direction of the system. The suction cups of the first and second grippers face each other. The two grippers can be moved apart by means of a displacement of the pipetting tubes and can each be arranged on an opposite side of a laboratory article to be gripped. The grippers can then be moved together until the rims of the suction cups lie against at least one corresponding side surface. If the negative pressure is then directed to the suction cups, they suck onto the surface of the laboratory article. A heavy laboratory article can be held securely from two opposite sides. Alternatively, the grippers can be oriented at an angle to one another, which makes it possible to grip a laboratory article from sides which are oriented at an angle to one another. For example, the grippers can be aligned at right angles to one another. However, any other angle is also possible.

In one embodiment, the pipetting system comprises a holder for receiving at least one gripper. The gripper is designed in such a way that the coupling of the gripper is in the intended use position at the top and a pipetting tube can be inserted into the coupling of the gripper from above in the Z direction. A support surface prevents the gripper from being pushed down when the pipetting tube is inserted. If the gripper is fixed to the pipetting tube, it can be moved out of the holder upwards or to one side. If the gripper is no longer required, it can be deposited again in the holder. For this purpose, it can be retracted laterally into the holder. Retaining elements prevent the gripper from leaving the holder when the pipetting tube is retracted upwards in the Z direction. A plurality of holders can be arranged next to one another, for example in the Y direction.

In one embodiment, the pipetting tube comprises a shaft with a cylindrical first section, a conically downwardly converging second section and a cylindrical third section, the diameter of the third section being smaller than the diameter of the first section. Alternatively, the shaft can comprise a cylindrical and/or a conically converging section. It is also possible for the shaft to comprise a plurality of cylindrical sections which are stepped relative to one another.

In one embodiment, a circumferential groove is provided in the third section of the shaft, in which an annular second seal is arranged, the outer contour of which protrudes outward beyond the contour of the third section.

In one embodiment, a circumferential groove is provided in the first section of the shaft, in which an annular third seal is arranged, the outer contour of which protrudes outward beyond the contour of the first section.

In one embodiment, a circumferential first elevation is provided in the first section of the shaft, the outer contour of which protrudes outward beyond the contour of the first section, the outer contour of the first elevation of the pipetting tube lying within the contour of the first recess of the coupling. The first elevation centres the pipetting tube in the first recess. The first elevation can also serve as a retaining element in combination with the first force disk. The elevation can be continuous and/or stepped.

In one embodiment, a circumferential groove is provided in the first section of the shaft, into which the annular, elastic coupling element engages in the assembled state. The contour of the groove in cross section can correspond to the contour of the coupling element or can be approximated, for example by straight sections. In order to be able to change the coupling behaviour, the groove can, for example, be provided with a chamfer or with a running-in. The larger the chamfer or the running-in, the lower the separation forces required for the uncoupling.

In one embodiment, the pipetting system comprises two or more grippers according to the invention, wherein at least two of the grippers can jointly grip a laboratory article from opposite sides or from mutually angled sides.

The aforementioned embodiments of the pipetting system can be combined with one another as desired, provided they do not contradict each other.

BRIEF DESCRIPTION OF THE DRAWINGS

Exemplary embodiments of the present invention are explained in more detail below with reference to figures. These are for explanation only and should not be interpreted restrictively. It shows FIG. 1 a perspective view of a gripper according to the invention.

DETAILED DESCRIPTION OF THE INVENTION

Figure 1:
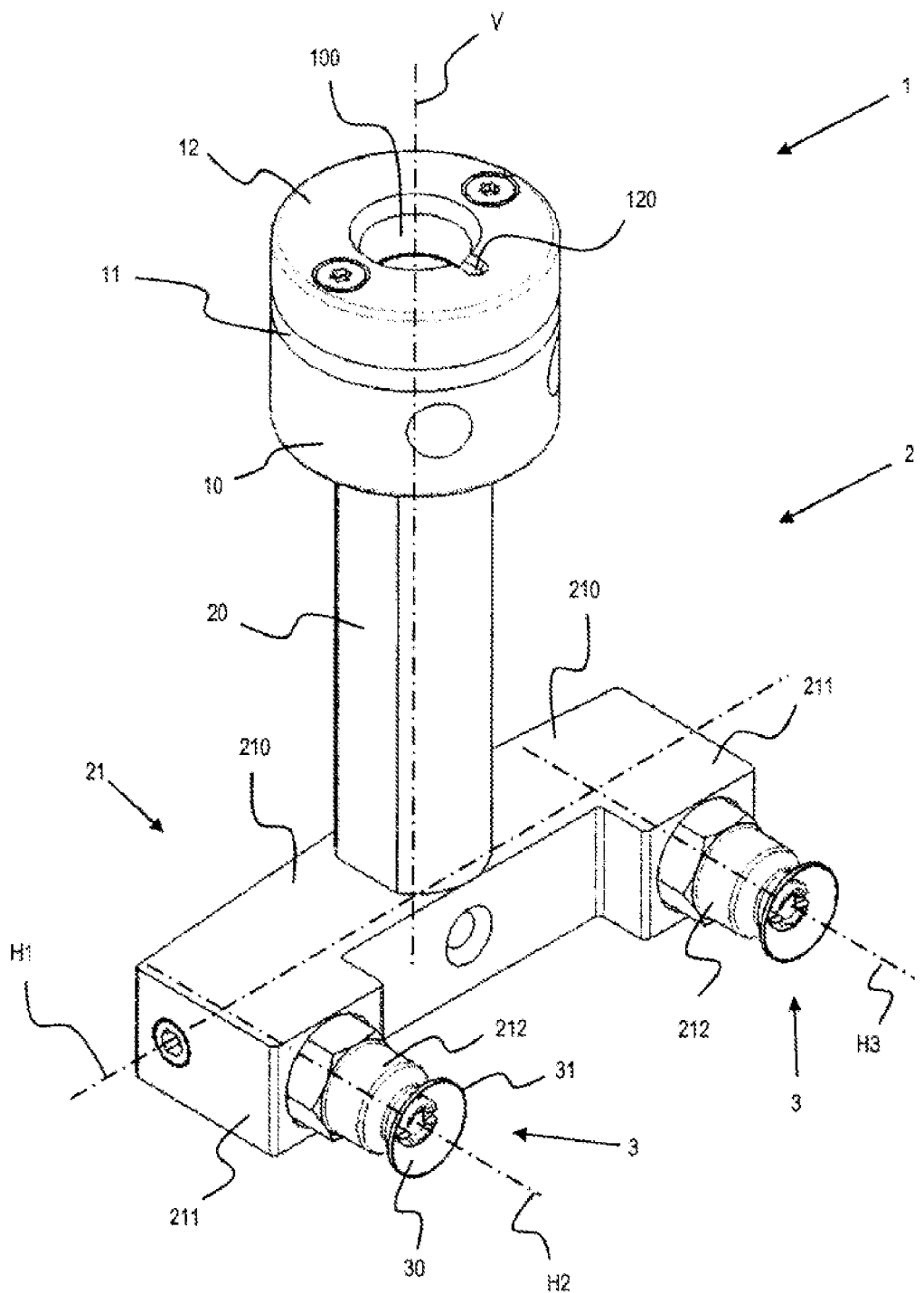

FIG. 1 shows a perspective view of a gripper according to the invention. This figure corresponds to a position of use according to the invention. The gripper comprises a coupling 1, a fluid channel 2, which extends from the coupling 1, and suction cups 3, which are connected to the coupling 1 via the fluid channel 2 in such a way that a negative pressure can be transmitted from the coupling 1 to the suction cups 3. Accordingly, the coupling 1 is at the top and the suction cups 3 at the bottom. The coupling 1 comprises a cylindrical body 10, a first force disk 11 and an axial guiding ring 12, the first force plate 11 being clampable between the upper end face of the body 10 and the lower end face of the guiding ring 12. In the illustrated embodiment, screws are used to generate the clamping effect. A first recess 100 is provided in the upper end face of the guiding ring 12 and extends downward from the centre of the upper end face of the guiding ring 12 in the direction of a vertical axis V. A second recess 120 is provided in the upper end face of the guiding ring 12 and extends radially outward from the first recess over part of the upper end face. The fluid channel 2 connects to the coupling 1 below. The fluid channel 2 comprises a vertical first section 20 and a horizontal second section 21, the first section 20 extending in the direction of the vertical axis V and the second section extending in the direction of a first horizontal axis H1. The lateral dimensions along the fluid channel 2 are smaller than the lateral dimensions of the coupling 1. The vertical first section 20 opens out in the middle into the horizontal second section 21, as a result of which the fluid channel 2 is divided into two. The second section 21 comprises an inner section 210 and an outer section 211, the inner section extending in the direction of the first horizontal axis H1 and the outer section 211 in the direction of a second horizontal axis H2, resp. in the direction of a third horizontal axis H3. The first, second and third horizontal axes H1, H2, H3 are arranged in a common horizontal plane. The first horizontal axis H1 is perpendicular to the second horizontal axis H2 and perpendicular to the third horizontal axis H3. The second horizontal axis H2 is parallel to the third horizontal axis H3. A through hole, which extends along the first horizontal axis H1, is laterally sealed with respect to the gripper by screw-in closures. The outer section 211 extends with respect to the gripper, from the inner section 210 to the front in the direction of the second horizontal axis H2 or in the direction of the third horizontal axis H3. A suction cup 3 is arranged on the front-end face of the outer section 211 by means of a screw-in holder 212. Each suction cup 3 comprises a suction bell 30 with a closed peripheral rim 31. The inside of the suction bell 30 is connected to the fluid channel 2 by the holder 212 in such a way that a negative pressure can be transmitted from the coupling to the respective suction cup 3.

Figure 2:
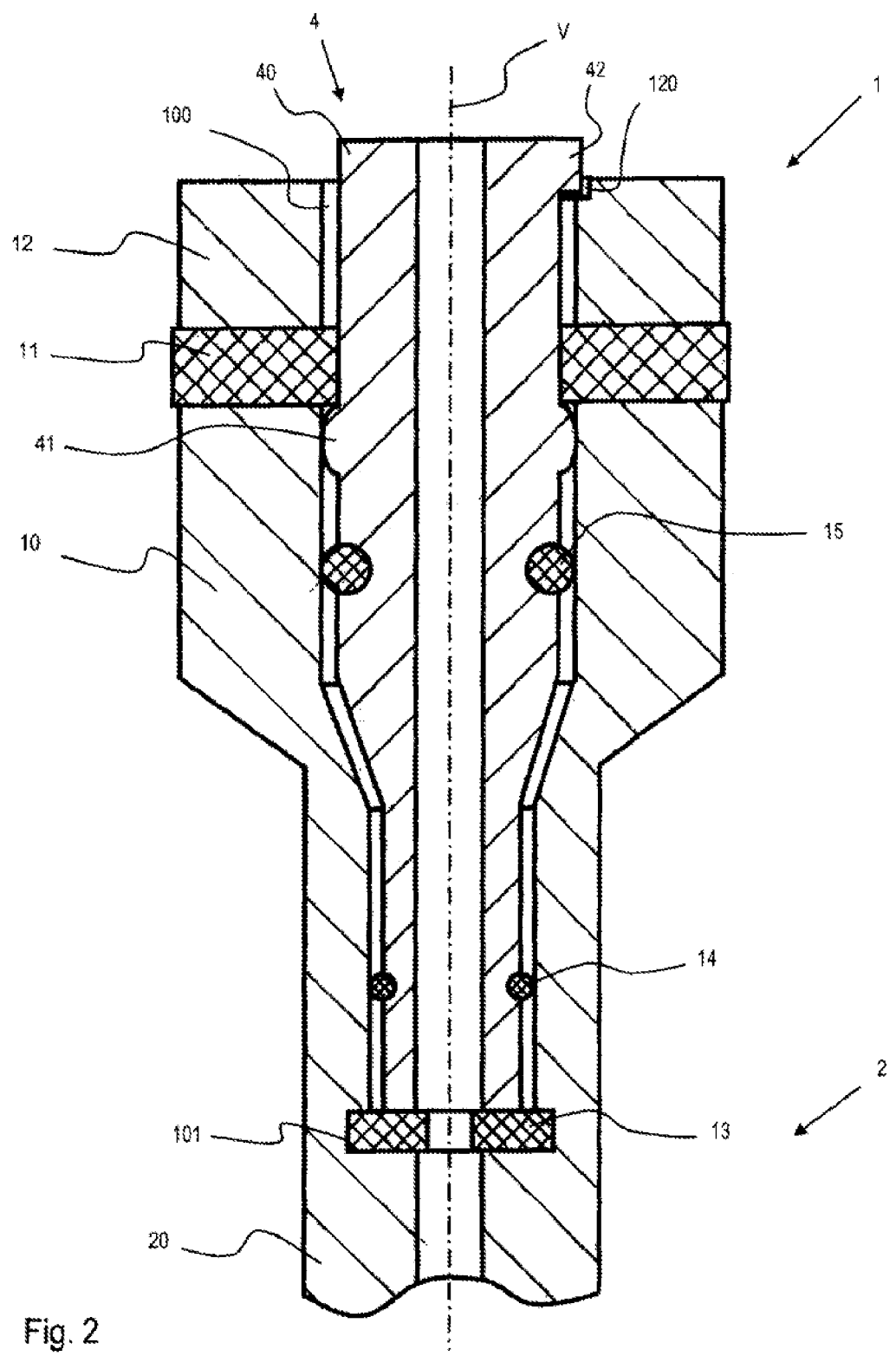
FIG. 2 is a schematic sectional view of the coupling area of a first embodiment of a gripper according to the invention.

FIG. 2 shows a schematic sectional view of the coupling area of a first embodiment of a gripper according to the invention, which is arranged on a pipetting tube 4. The coupling 2 and the first section 20 of the fluid channel 2 extend along the vertical axis V. A shaft 40 of the pipetting tube 4 is arranged centrally in the first recess 100 of the coupling 1. The first recess 100 and the shaft 40 comprise an upper, cylindrical first region, a second region adjoining it below and conically converging downward, and a cylindrical third region adjoining it below. An air gap is provided between the inner walls of the first recess 100 and the outer walls of the shaft 40. At the lower end of the third region of the first recess 100, a circumferential first groove 101 is provided, in which an annular disk-shaped first seal 13 is arranged. The lower end face of the shaft 40 abuts the upper end face of the first seal 13. In the third region of the shaft 40, a circumferential groove is provided, in which an annular second seal 14 is arranged. A circumferential groove is provided in the first region of the shaft 40, in which an annular third seal 15 is arranged. The second seal 14 and the third seal 15 close the air gap between the gripper and the pipetting tube 4. They can also be used for centring, a sealing effect and a fixation. The cross-sectional diameter of the third seal 15 is larger than that of the second seal 14. A circumferential first elevation 41 is provided in the first region of the shaft 40, which protrudes radially over the circumference of the cylindrical first region. The radial outer contour of the first elevation 41 is smaller than the inner diameter of the first recess 100. The first force disk 11 has the shape of an annular disc, the inner diameter of which in the tensioned state is smaller than the inner diameter of the first recess 100. In the assembled state, the inner side of the first force disk 11 can contact the outside of the first area of pipetting tube 4, through which centring, sealing and fixing can be achieved. The first force disk 11 is then arranged in the assembly above the first elevation 41 and forms a retaining element for the gripper. With this configuration, the gripper can be removed from the pipetting tube 4 with a reasonable amount of force. In the first shaft area of the pipetting tube 4, a radially outwardly extending second elevation 42 is provided which, when assembled, can engage in the second recess 120 of the coupling 1, as a result of which a relative rotation between the gripper and the pipetting tube can be prevented.

Figure 3:
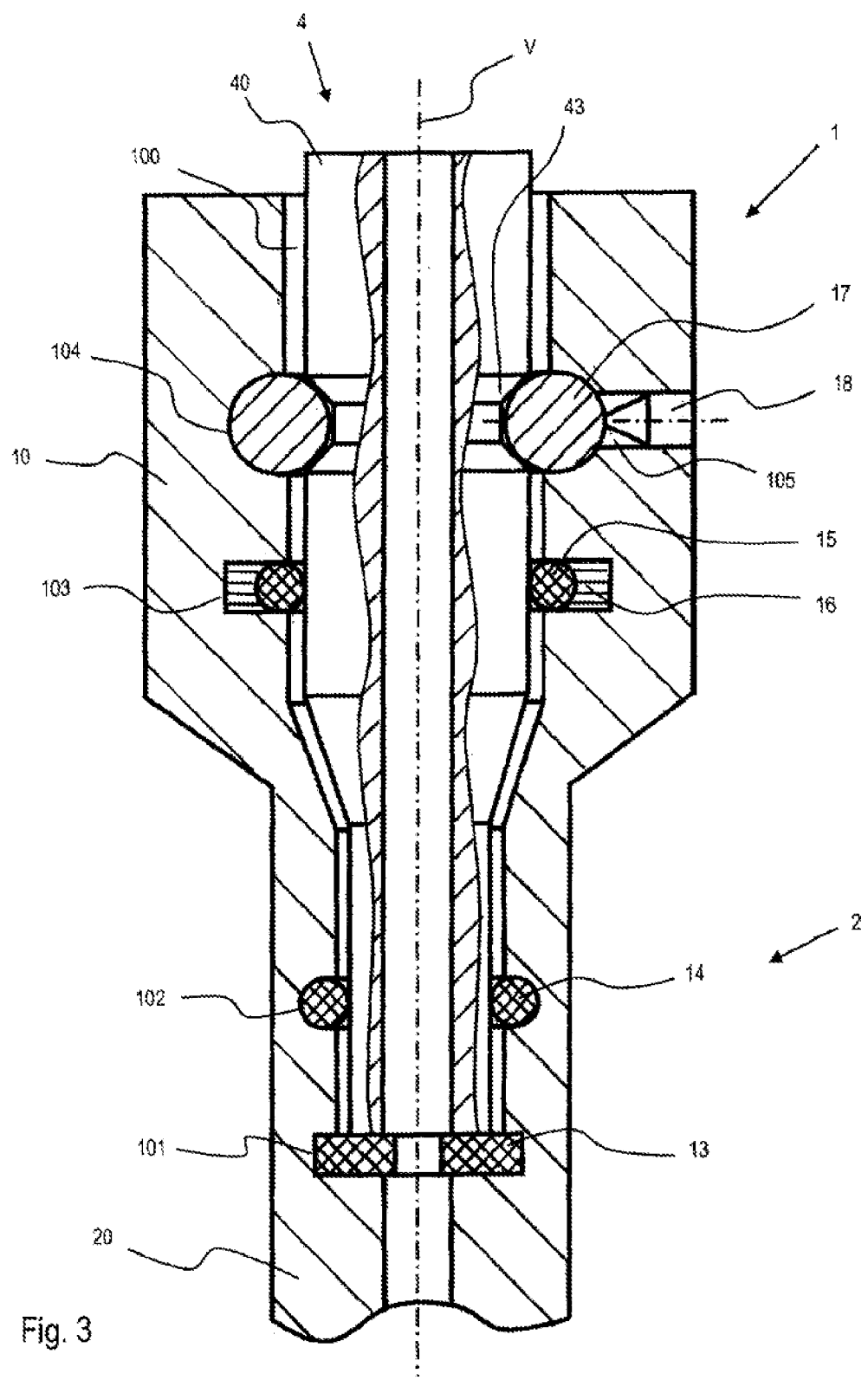
FIG. 3 a schematic sectional view of the coupling area of a second embodiment of a gripper according to the invention.

FIG. 3 shows a schematic sectional view of the coupling area of a second embodiment of a gripper according to the invention, which is arranged on a pipetting tube 4. In contrast to the first embodiment, in this embodiment a circumferential second groove 102 is provided in the third region of the first recess 100, in which an annular second seal 14 is arranged. In the first region of the first recess 100, a circumferential third groove 103 is provided, in which a third seal 15 and a second force disk 16 are arranged, the force disk 16 being able to exert a radially inward force component on the third seal 15. The second seal 14 and the third seal 15 close the air gap between the gripper and the pipetting tube 4. In the first area of the first recess 100, a circumferential fourth groove 104 is provided, in which a toroidal coupling element 17 is arranged. The inside diameter of the coupling element 17 projects into the diameter of the first recess 100. In the first region of the shaft 40, a circumferential groove 43 is provided, into which the coupling element 17 can engage in the assembled state. With this configuration, the gripper can be removed from the pipetting tube 4 with a reasonable amount of force. In the area of the fourth groove 104, an outwardly extending radial bore 105 is provided in the body 10 of the coupling 1, in which a pusher 18 is arranged. With the pusher 18, a radially inward force can be exerted on the coupling element 17, whereby the clamping force of the coupling element 17 is adjustable.

Of course, the elements of the first embodiment can be combined with those of the second embodiment.

Figures 4A, 4B:
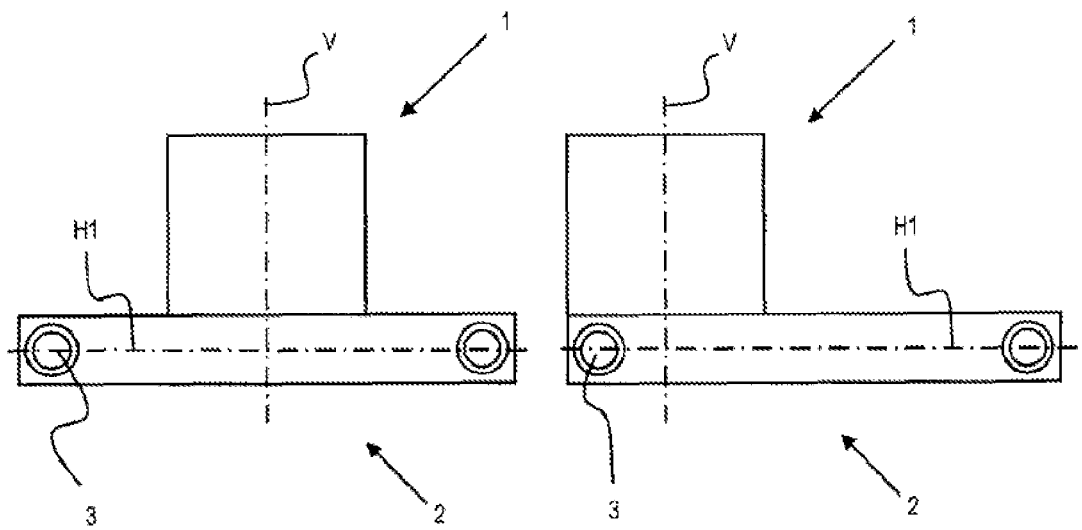
FIG. 4*a*-4*d* schematic representations of arrangements of the coupling, the fluid channel and the suction cups of a gripper according to the invention.

FIGS. 4a to 4d show schematic representations of arrangements of the coupling 1, the fluid channel 2 and the suction cups 3 of a gripper according to the invention. FIG. 4a shows an embodiment in which the fluid channel 2 only comprises horizontal sections and the suction cups 3 are arranged laterally symmetrically with respect to the vertical axis V.

FIG. 4b shows a corresponding asymmetrical arrangement of the suction cups 3 with respect to the vertical axis V.

Figures 4C, 4D:
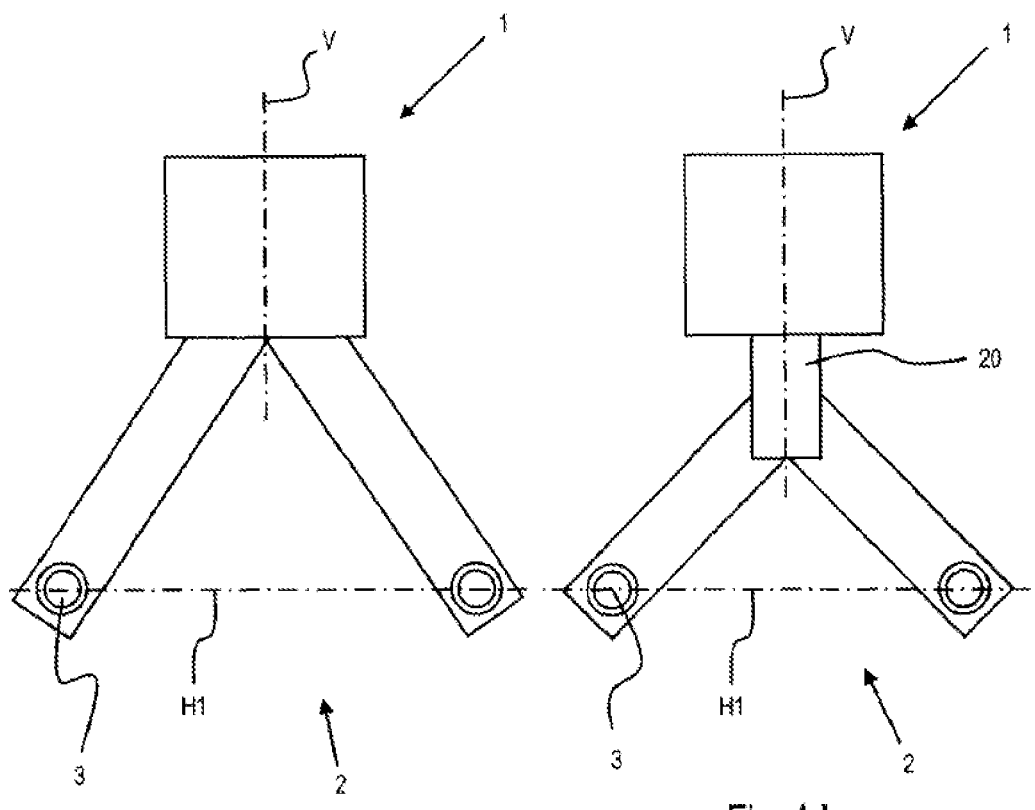

FIG. 4c shows a gripper with two fluid channels 2, which are inclined with respect to the vertical axis, the suction cups 3 arranged at the respective end of the fluid channel 2 being arranged in a common horizontal plane, which includes the first horizontal axis H1.

FIG. 4d shows a gripper with a fluid channel 2 with a first vertical section 20 and two inclined sections adjoining these.

REFERENCE SIGNS LIST

| 1 | Coupling | 21 | second section |
|---|---|---|---|
| 10 | Body | 210 | inner section |
| 100 | first recess | 211 | outer section |
| 101 | first groove | 212 | Holder |
| 102 | second groove | 3 | Suction cup |
| 103 | third groove | 30 | Suction bell |
| 104 | fourth groove | 31 | Rim |
| 105 | radial bore | 4 | Pipetting tube |
| 11 | first force disk | 40 | Shaft |
| 12 | axial guiding ring | 41 | first elevation |
| 120 | second recess | 42 | second elevation |
| 13 | first seal | 43 | Groove |
| 14 | second seal | V | vertical axis |
| 15 | third seal | H1 | first horizontal axis |
| 16 | second force disk | H2 | second horizontal axis |
| 17 | Coupling element | H3 | third horizontal axis |
| 18 | Pusher | | |
| 2 | Fluid channel | | |
| 20 | first section | | |

The invention claimed is:

1. A gripper comprising
a mechanical coupling (1), with which the gripper is connectable to a pipetting tube (4),
at least one fluid channel (2), which extends from the coupling (1) and with which a negative pressure is transmittable,
characterized in that the gripper comprises at least one suction cup (3) which is connected to the coupling (1) through the at least one fluid channel (2), as a result of which the negative pressure can be transmitted from the coupling (1) to the at least one suction cup (3),
and in that the in the intended use position of the gripper, the at least one suction cup (3) is oriented such that a rim (31) of a suction bell (30) of the at least one suction cup (3) is oriented in a substantially vertical plane.

2. The gripper according to claim 1, wherein the fluid channel (2) comprises at least a first section (20) which, in the intended use position of the gripper, extends in a second substantially vertical plane (V, H1).

3. The gripper according to claim 2, wherein the at least one first section (20) extends substantially in the direction of a vertical axis (V) and/or wherein the at least one first section (20) extends inclined with respect to the vertical axis (V).

4. The gripper according to claim 1, wherein the fluid channel (2) comprises at least one second section (21) which, in the intended use position of the gripper, extends in a substantially horizontal plane (H1, H2, H3).

5. The gripper according to claim 4, wherein the second section (21) comprises an inner section (210) which extends substantially in a first horizontal direction (H1) and an outer section (211) which extends essentially extends in a second horizontal direction (H2).

6. The gripper according to claim 1, wherein the sections (20, 21) of the fluid channel (2) are straight or curved.

7. The gripper according to claim 1, wherein the gripper comprises two or more suction cups (3), wherein at least two of the suction cups (3) being arranged in a common horizontal plane (H1, H2, H3).

8. The gripper according to claim 1, wherein a first recess (100) which extends along the vertical axis (V) and in which the pipetting tube (4) is receivable and fixable is provided in the upper end face of the coupling (1).

9. The gripper according to claim 8, wherein a first force disk (11) is arranged clampable at the upper free end of the coupling (1) between the body (10) and an axial guiding ring (12), wherein in the clamped state, the inner contour of the first force disk (11) protrudes into the interior of the contour of the first recess (100).

10. The gripper according to claim 8, wherein at least one second recess (120) is provided at the upper free end of the coupling (1), which extends radially outward from the first recess (100) and in which a second elevation (42) of the pipetting tube (4) is receivable, whereby a relative rotation of the gripper (1) with respect to the pipetting tube (4) can be prevented.

11. The gripper according to claim 8, wherein a circumferential first groove (101) is provided at the lower end of a third section of the first recess (100), in which an annular disk-shaped first seal (13) is arranged, the inner contour of which protrudes into the interior of the contour of the third section.

12. The gripper according to claim 8, wherein a circumferential second groove (102) is provided in a third section of the first recess (100), in which an annular second seal (14) is arranged, the inner contour of which protrudes into the interior of the contour of the third section.

13. The gripper according to claim 8, wherein a circumferential third groove (103) is provided in a first section of the first recess (100), in which an annular third seal (15) is arranged or in which an annular third seal (15) and a second force disk (16) are arranged, wherein the inner contour of the third seal (15) protruding into the interior of the contour of the first section.

14. The gripper according to claim 8, wherein a circumferential fourth groove (104) is provided in a first section of the first recess (100), in which an annular, elastic coupling element (17) is arranged, the inner contour of which protruding into the interior of the contour first section.

15. The gripper according to claim 14, wherein at least one radial bore (105) is provided in the coupling (1), which extends radially outward from the fourth groove (104) and in which a pusher (18) is arranged, with which one radially inward force can be exerted on the coupling element (17).

16. A pipetting system comprising:
a pipetting device with a vacuum source and with at least one pipetting tube (4) which is connected to the vacuum source,
characterized in that the pipetting system further comprises at least one gripper according to claim 1, which can be fixed to the pipetting tube (4) with the coupling (1).

17. The pipetting system according to claim 16, wherein a circumferential first elevation (41) is provided in the first section of the shaft (40), the outer contour of which protrudes outward beyond the contour of the first section, wherein the outer contour of the first elevation (41) of the pipetting tube (4) lies within the contour of the first recess (100) of the coupling (1).

18. The pipetting system according to claim 16, wherein a circumferential groove (43) is provided in the first section of the shaft (40), into which the annular, elastic coupling element (17) engages in the assembled state.

19. The pipetting system according to claim 16, comprising two or more grippers according to the invention, wherein at least two of the grippers can jointly grip a laboratory article from opposite sides or from sides angled to each other.

* * * * *